(12) United States Patent
Johnson

(10) Patent No.: US 10,825,349 B2
(45) Date of Patent: Nov. 3, 2020

(54) PORTABLE TACTICAL SIMULATED BARRICADE

(71) Applicant: Franz Alberto Johnson, Briarwood, NY (US)

(72) Inventor: Franz Alberto Johnson, Briarwood, NY (US)

( * ) Notice: Subject to any disclaimer, the term of this patent is extended or adjusted under 35 U.S.C. 154(b) by 79 days.

(21) Appl. No.: 16/266,055

(22) Filed: Feb. 2, 2019

(65) Prior Publication Data

US 2020/0251009 A1   Aug. 6, 2020

(51) Int. Cl.
  *F41H 5/08*   (2006.01)
  *G09B 9/00*   (2006.01)

(52) U.S. Cl.
  CPC .................. *G09B 9/003* (2013.01)

(58) Field of Classification Search
  CPC .................. F41H 1/00; A42B 3/00
  See application file for complete search history.

(56) References Cited

U.S. PATENT DOCUMENTS

| | | | | |
|---|---|---|---|---|
| 4,782,735 A * | 11/1988 | Mui | ........................ | F41H 5/08 102/303 |
| 6,807,890 B1 * | 10/2004 | Fuqua | ...................... | F41H 5/08 89/36.02 |
| 7,424,844 B2 * | 9/2008 | Carter | ...................... | F41H 5/08 89/36.05 |
| 7,891,283 B2 * | 2/2011 | Kleniatis | .................. | F41H 5/08 89/36.09 |
| 9,038,522 B2 * | 5/2015 | Martin | .................... | F41H 5/263 89/36.07 |
| 9,631,901 B2 * | 4/2017 | Martin | ...................... | F41H 5/08 |
| 2006/0230916 A1 * | 10/2006 | Sand | ........................ | F41H 5/08 89/36.07 |
| 2007/0193441 A1 * | 8/2007 | Carter | ...................... | F41H 5/08 89/36.07 |
| 2007/0295199 A1 * | 12/2007 | Elasic | ...................... | F41H 5/08 89/36.06 |
| 2014/0238225 A1 * | 8/2014 | Mickiewicz | .............. | F41H 5/08 89/36.07 |
| 2018/0017360 A1 * | 1/2018 | Adamow | .................. | F41H 5/08 |
| 2018/0073841 A1 * | 3/2018 | DeKort | .................... | F41H 5/24 |

* cited by examiner

*Primary Examiner* — Sunit Pandya

(57) ABSTRACT

A portable tactical simulated shooter barricade for shooting ranges with a target located down-range. A portable tactical simulated barricade consisting of a barricade attached vertically to a base stand by a continuous hinge and kept in place vertically by a sash lock, forming the base barricade designed for use atop the counter in shooter's booth at an indoor gun range. A portable tactical simulated barricade consists of a second, detachable barricade that can be adjusted vertically to different height displacement by a dowel lock inserted laterally into a sliding mechanism. The sliding mechanism which is located vertically at the midportion the barricade and perpendicularly to base stand, has a male and female component to facilitate upward and downward motion of the detachable barricade parallelly against the base barricade. The base stand is locked to the vertical barricade by a sash lock and can be pivoted toward the vertical portion, of the barricade by a continuous hinge. Velcro strips lock the folded base to the vertical barricade, facilitating storage and transport.

2 Claims, 21 Drawing Sheets

| ITEM NO. | PART NUMBER | DESCRIPTION | QTY. |
|---|---|---|---|
| 1 | Base barricade | 15 x 31.50 x 0.25 | 1 |
| 2 | Left and right leg | 14 x 1.5 x 1.5 | 2 |
| 3 | Locking part | 30 x 0.75 x 0.50 | 2 |
| 4 | Mid sliding part | 30.75 x 1.5 x 0.75 | 1 |
| 5 | Support above leg | 15 x 1.5 x 0.25 | 1 |
| 6 | Support above leg support | 15 x 1.5 x 1.5 | 1 |
| 7 | Support between Legs | 12 x 1.5 x 1.5 | 1 |
| 8 | Detachable barricade | 15 x 48 x 0.25 | 1 |
| 9 | Mid sliding part | 30 x 0.50 x 0.75 | 2 |
| 10 | Bright Nickel Continuous Hinge | Bright Nickel Continuous Hinge | 1 |
| 11 | Dowel Lock | Dowel Lock | 1 |
| 12 | Locking part-top | 8 x 0.75 x 0.50 | 1 |
| 13 | velcro strip | velcro strip | 2 |
| 14 | Wood screws | 12 x 3 zinc fl hd phil wood screws | 22 |
| 15 | Sash lock | sash lock | 1 |

| ITEM NO. | PART NUMBER | DESCRIPTION | QTY. |
| --- | --- | --- | --- |
| 1 | Base barricade | 15 x 31.50 x 0.25 | 1 |
| 2 | Left and right leg | 14 x 1.5 x 1.5 | 2 |
| 3 | Locking part | 30 x 0.75 x 0.50 | 2 |
| 4 | Mid sliding part | 30.75 x 1.5 x 0.75 | 1 |
| 5 | Support above leg | 15 x 1.5 x 0.25 | 1 |
| 6 | Support above leg support | 15 x 1.5 x 1.5 | 1 |
| 7 | Support between Legs | 12 x 1.5 x 1.5 | 1 |
| 8 | Detachable barricade | 15 x 48 x 0.25 | 1 |
| 9 | Mid sliding part | 30 x 0.50 x 0.75 | 2 |
| 10 | Bright Nickel Continuous Hinge | Bright Nickel Continuous Hinge | 1 |
| 11 | Dowel Lock | Dowel Lock | 1 |
| 12 | Locking part-top | 8 x 0.75 x 0.50 | 1 |
| 13 | velcro strip | velcro strip | 2 |
| 14 | Wood screws | 12 x 3 zinc fl hd phil wood screws | 22 |
| 15 | Sash lock | sash lock | 1 |

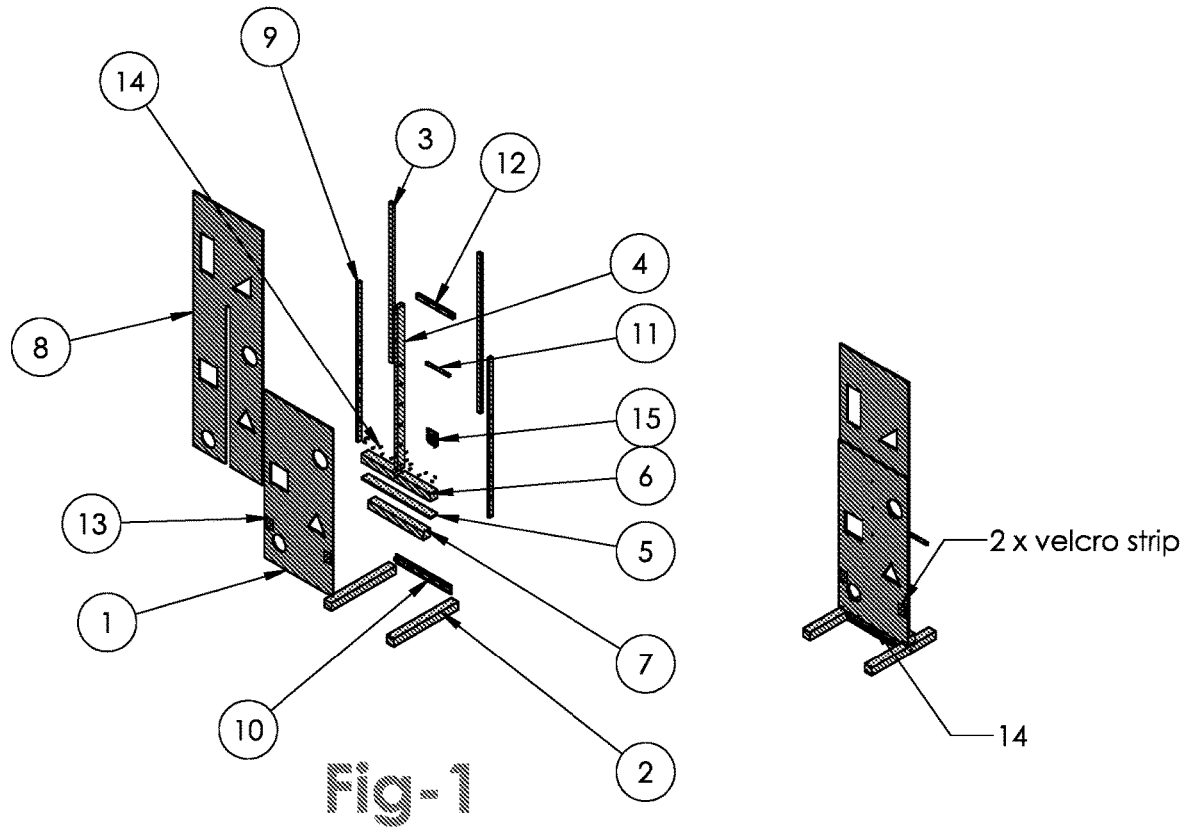

Fig-1

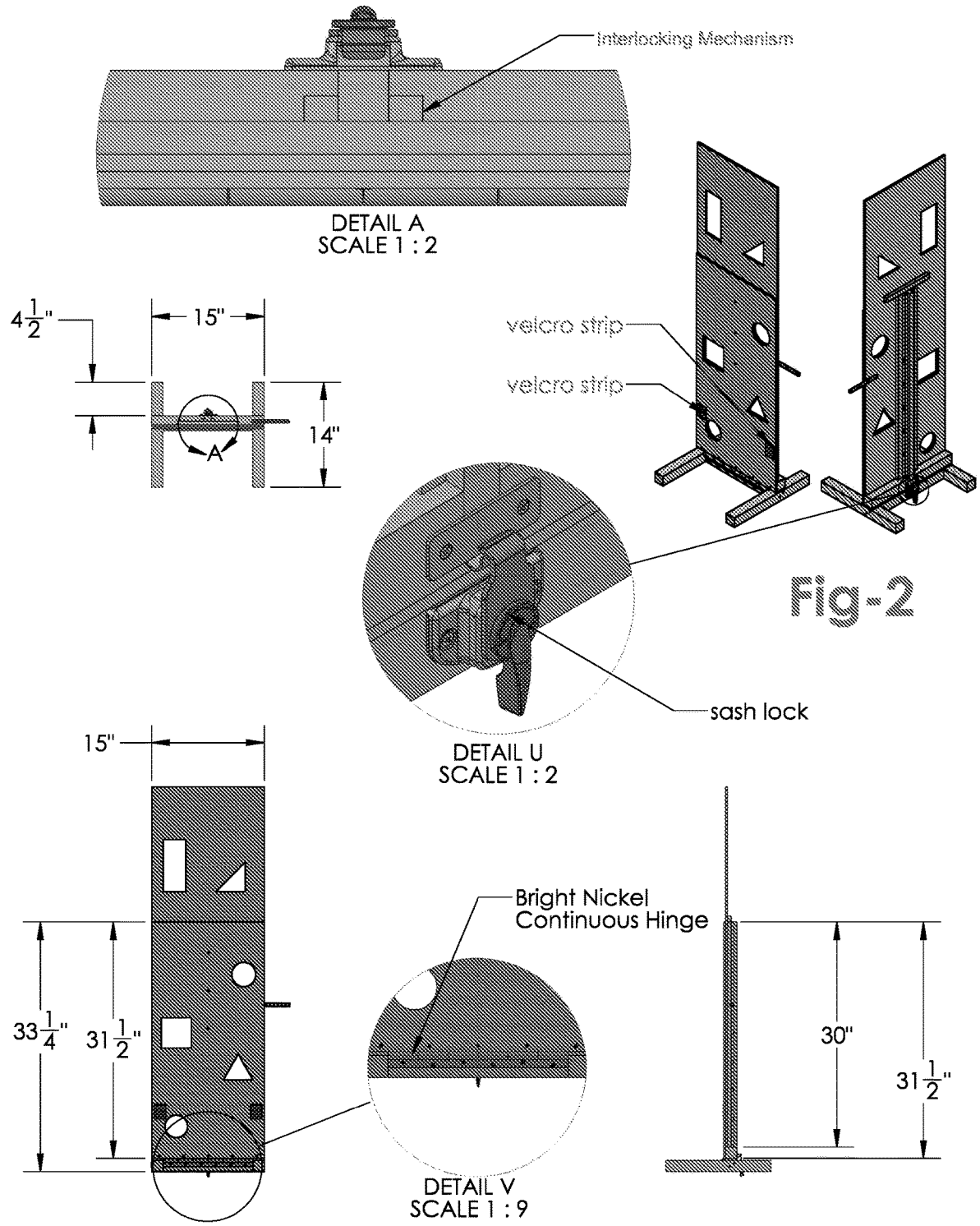

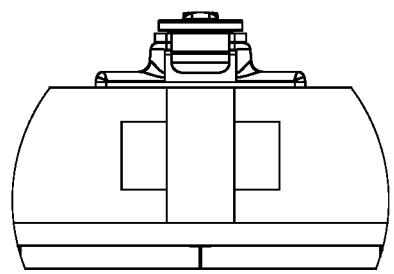
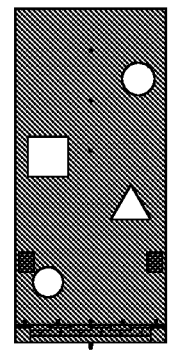
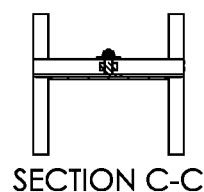
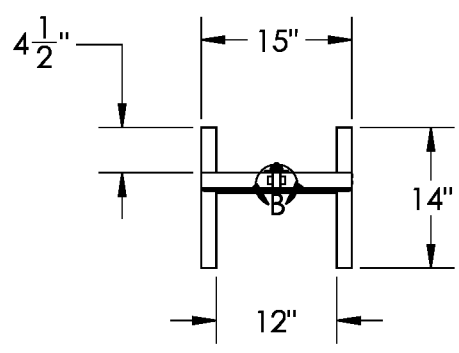
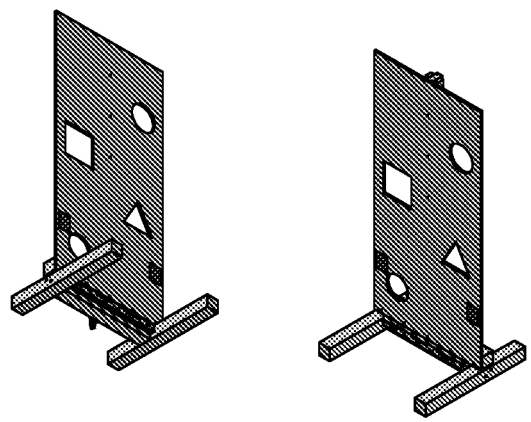
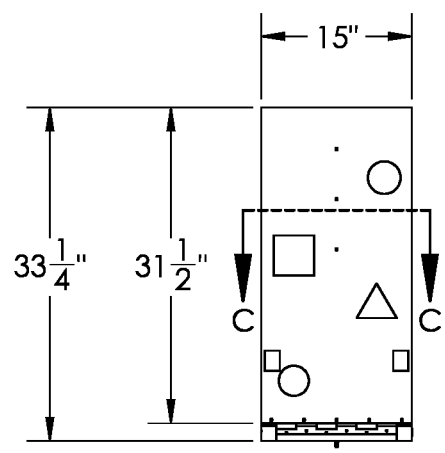
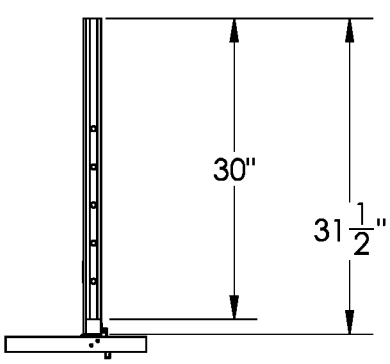
Fig-3

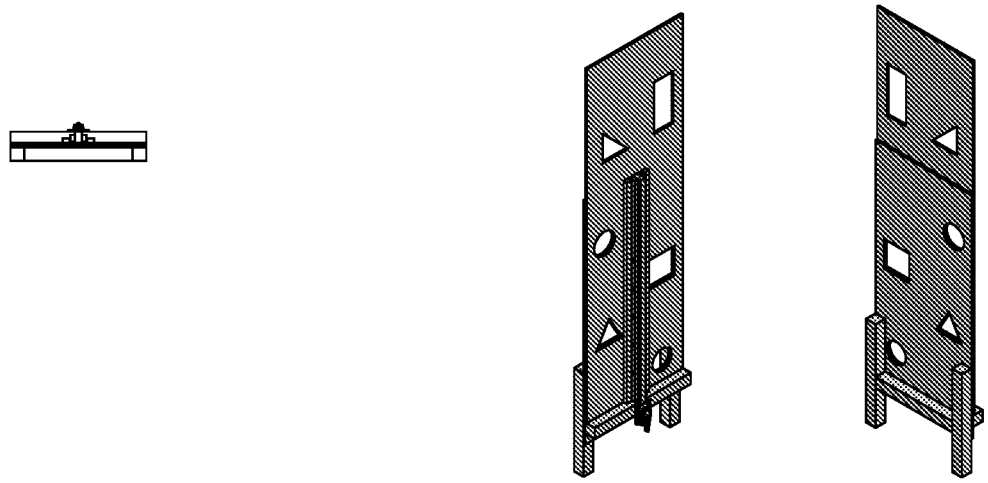
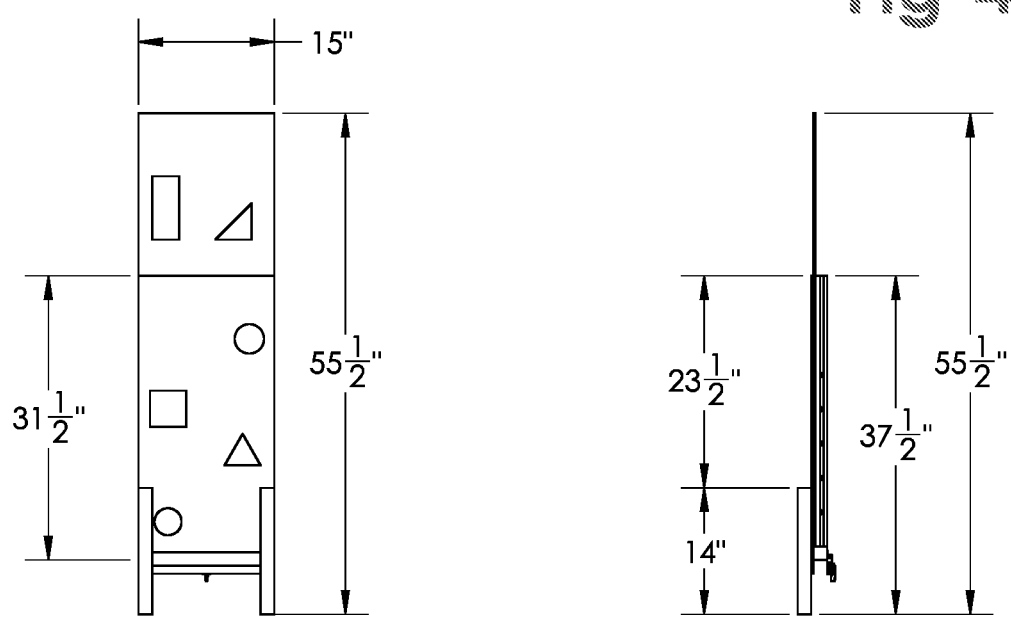
Fig-4

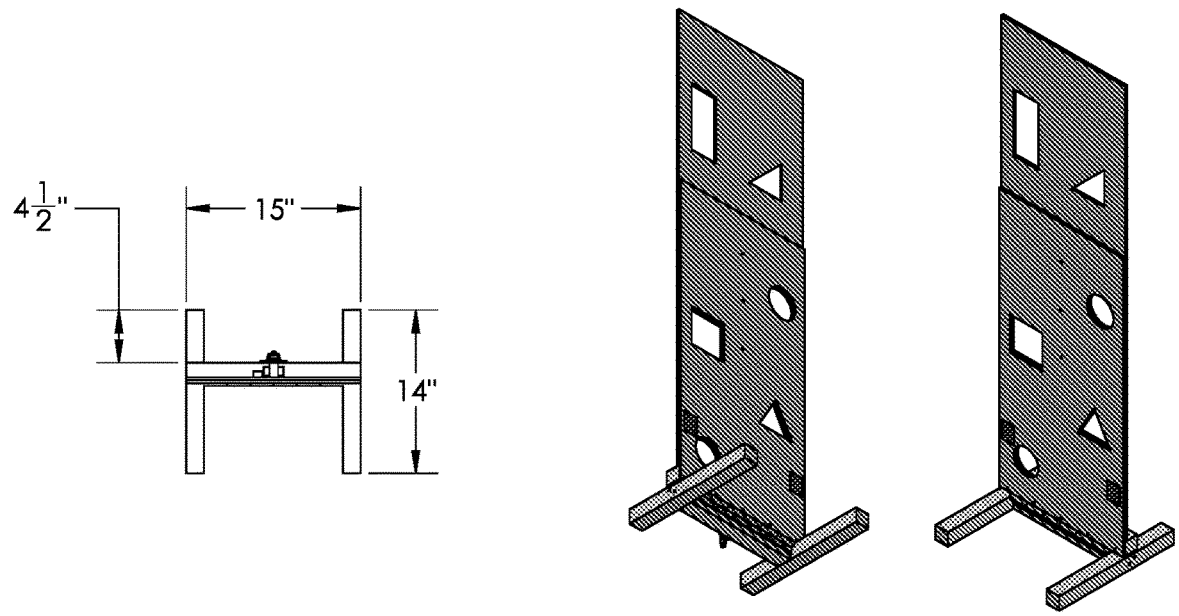
Fig-5
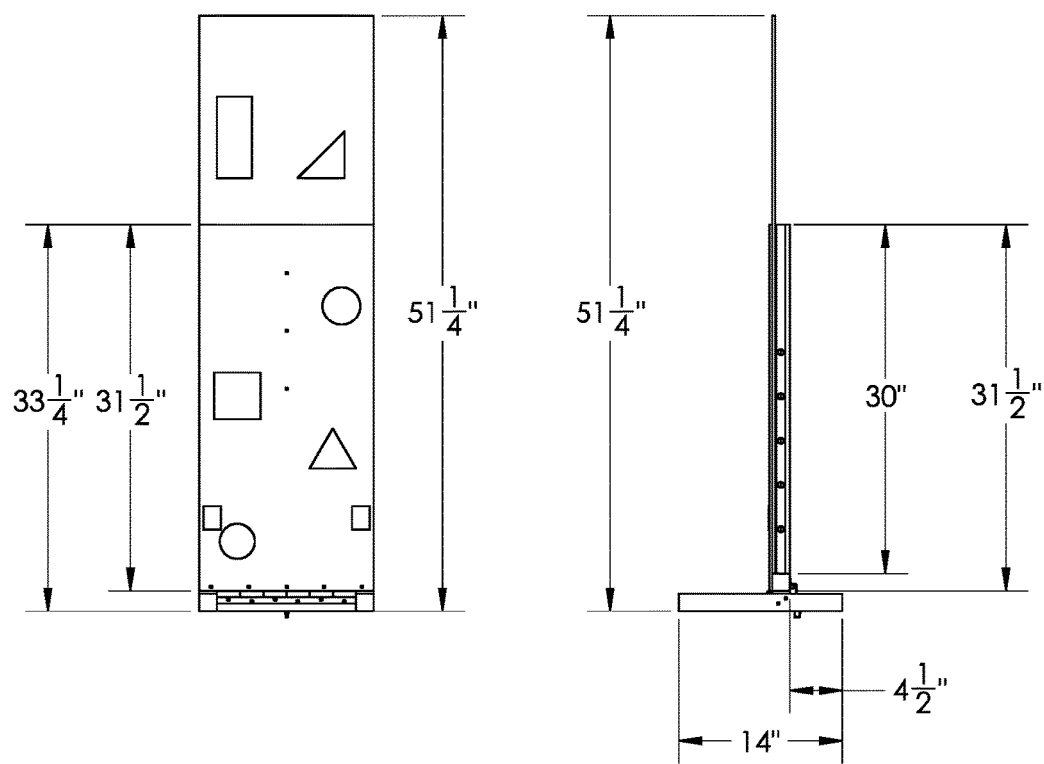

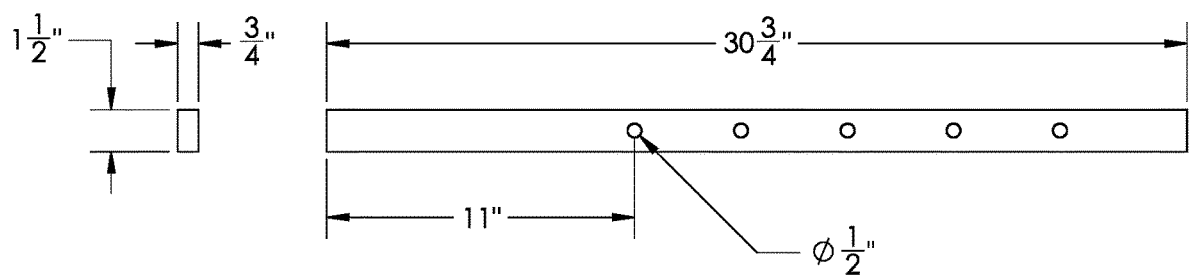
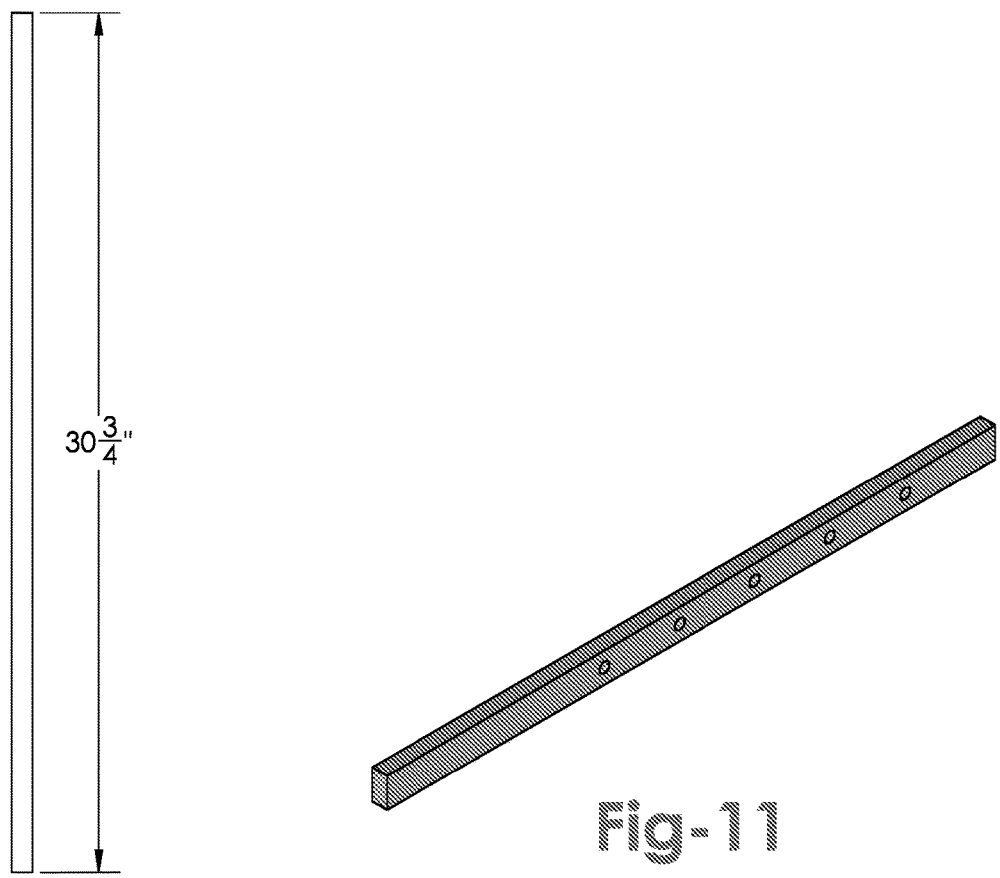
Fig-11

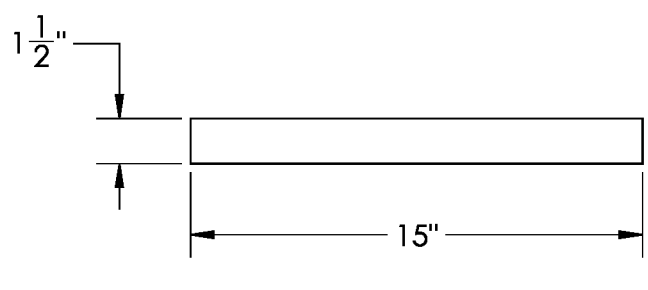
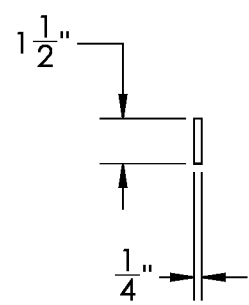
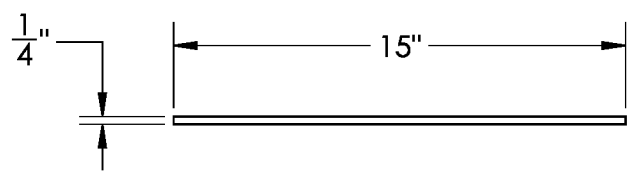
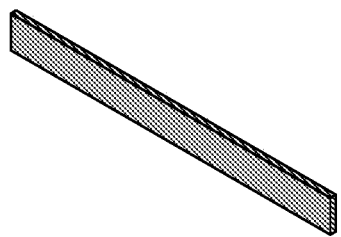
Fig-12

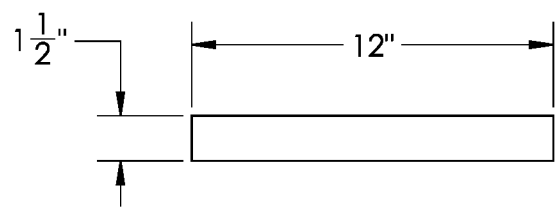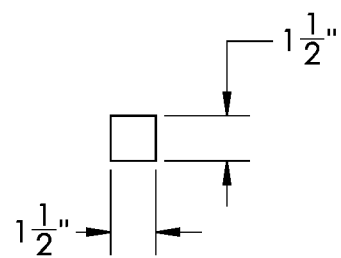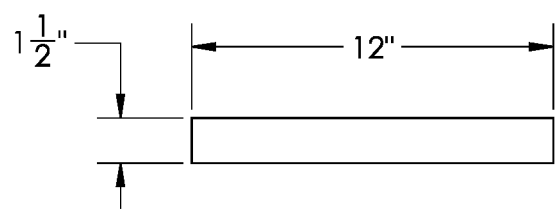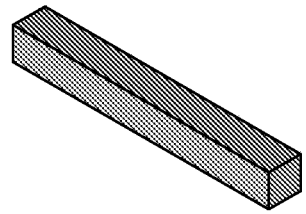
Fig-14

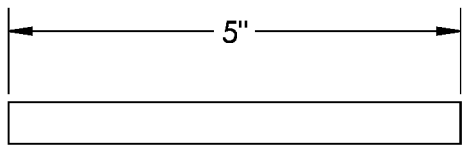
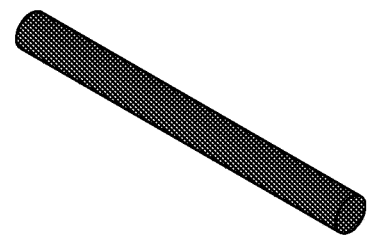
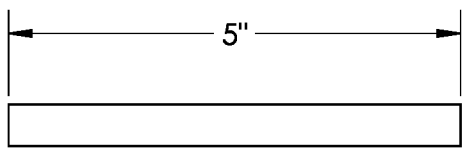
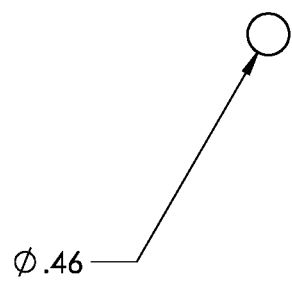
Fig-16

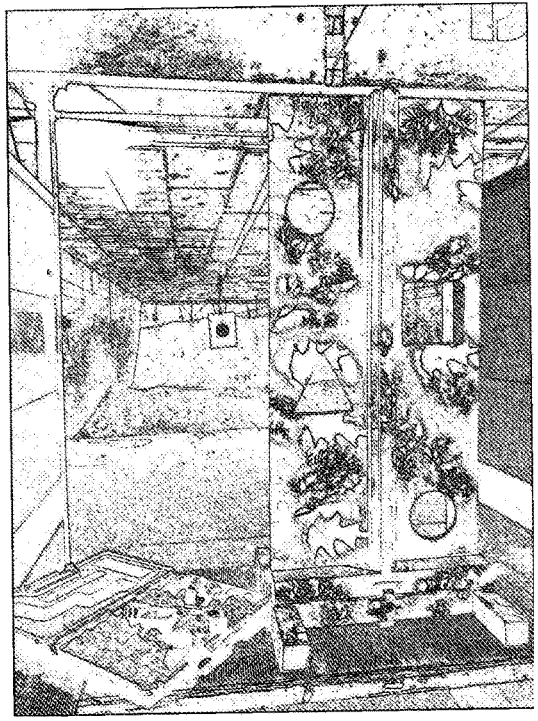
FIG-20A: Base Barricade Alone on Counter of Shooter's Booth
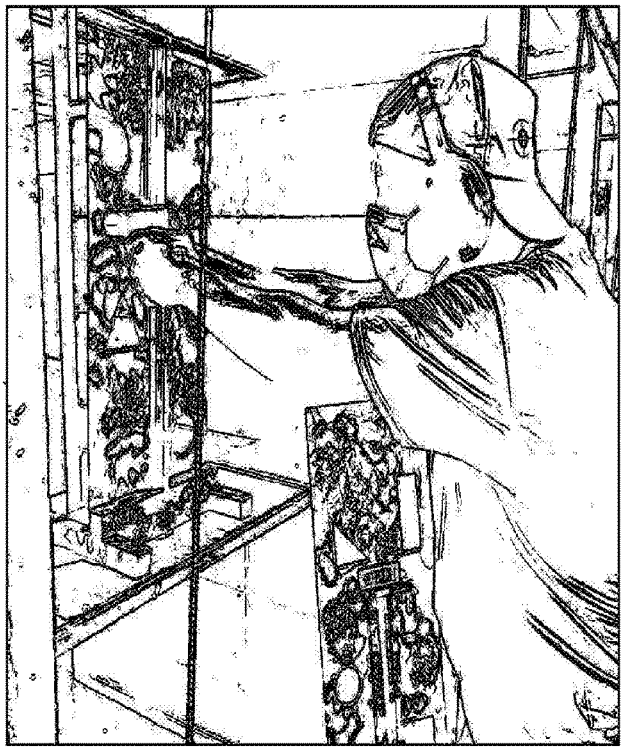
FIG-20B: Complete Barricade Standing Infront of Counter of Shooter's Booth
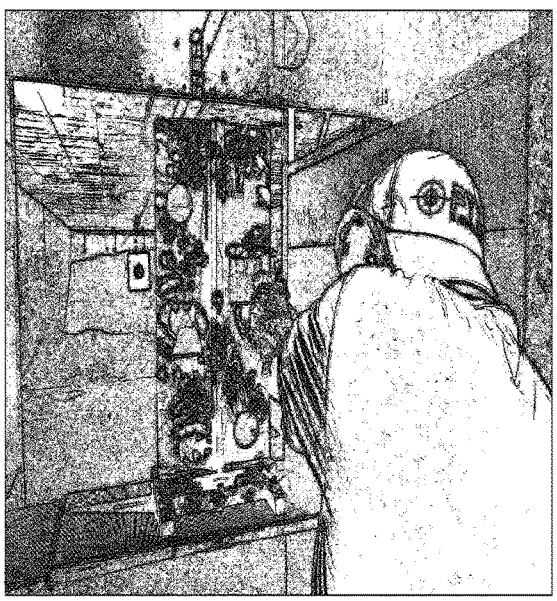
FIG 20C - Shooting at Target Down Range
Fig-20

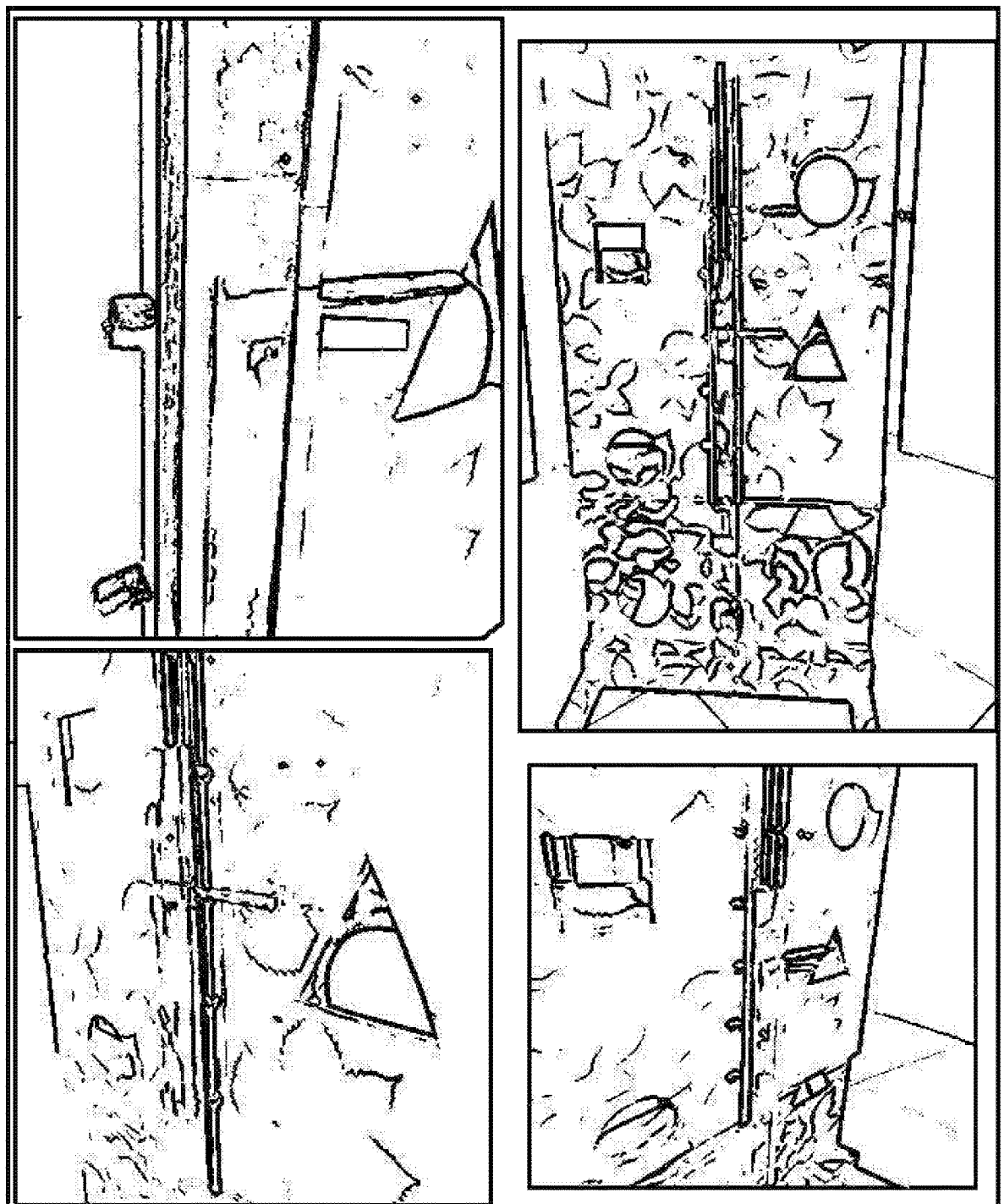

PORTABLE TACTICAL SIMULATED BARRICADE

CROSS-REFERENCE RELATED TO APPLICATIONS

Not Applicable

STATEMENT REGARDING FEDERALLY SPONSORED RESEARCH OR DEVELOPMENT (IF APPLICABLE)

Not Applicable

REFERENCE TO SEQUENCE LISTING, A TABLE, OR COMPUTER PROGRAM LISTING COMPACT DISC APPENDIX (IF APPLICABLE)

Not Applicable

BACKGROUND OF THE INVENTION

1. Field of the Invention

This invention pertains to the field of defensive or tactical target shooting, particularly learning/training to shoot a handgun around simulated barricades

2. Description of the Prior Art

Shooting through or around barricades with a handgun is an important skill for defensive shooters, be it civilian or law enforcement. Prior art tactical barricades for target practice involve mounting plywood consisting of various cut-out shapes or inserts to vertical posts with legs of some sort, and/or cardboard attached to vertical stakes driven into the ground with or without cut-outs of various shapes. These barricades are large, heavy, immobile and lack portability from home to the shooting range and suited only for outdoor gun ranges. As a result, persons interested in target practice training involving barricades lack access to a light-weight, portable, collapsible/expandable tactical barricade system that supports individualized, on-demand, defensive training both at outdoor and indoor gun ranges.

Tactical barricades have been in existence, but these traditional barricades are generally large, heavy, stationary, and impractical for use in everyday defensive training exercises. Moreover, traditional tactical barricades are generally designed with the rifleman in mind, and for outdoor training in situations where those barricades are designed to stay in place. A barricade that is easily transportable via car or other automobile or require minimal setup or is transferable from the outdoor to the indoor range, is nonexistent.

Consequently, opportunities for learning to master the art of working with barricades in defensive shooting remains unattainable both for the average law enforcement personnel and the civilian defensive shooter, particularly those who visit their local gun ranges to work on their marksmanship. For example, the typical gun range user, who shoots at targets from a countertop within a shooting booth, has no available barricade systems that is customized for this environment. Similarly, most outdoor ranges do not have barricades due to storage limitations and the challenges of moving them around (i.e., size and weight), which negates the usefulness and practicality of traditional tactical barricades in these settings. Typically, barricades are used in specialized training facilities, and generally under the supervision of range instructors. These platforms are typically bulky and immobile, reducing transferability. This reduces the usefulness of the traditional barricade system for a considerable portion of the shooting community, including private gun owners with home defense permits and conceal permit holders. Similarly, law enforcement officers who update their skill sets through regular individualized training may not have the opportunity to work with barricades, which is an important skill for their professional defensive encounters.

BRIEF SUMMARY OF THE INVENTION

It is an important feature of the present invention to provide an improved tactical simulated barricade system for a shooting range.

It is another feature of the present invention to provide a tactical simulated barricade for a shooting range having a light-weight, portable, collapsible platform.

It is a principal object of the present invention to provide a tactical shooter barricade which is cantilever mounted on a foldable stand.

It is another object of the present invention to provide a tactical shooter barricade consisting of a support base with two support legs connected to the vertical barricade by a continuous hinge and a sash lock.

It is another object of the present invention to provide a tactical simulated shooter barricade with a base that can be folded for storage/transportation using a continuous hinge.

It is another object of the present invention to provide a tactical simulated shooter barricade with a sash lock that locks the cantilever mounded barricade to the support perpendicularly so that the barricade stands upright at a shooting range for the purpose of performing barricade drills involving a target down-range.

It is another object of the present invention to provide a tactical simulated shooter barricade as described above wherein the barricade consists of two functional parts: a base barricade and a detachable barricade.

It is another object of the present invention to provide a base barricade designed specifically for usage on the countertop within an indoor gun range shooting booth.

It is another object of the present invention to provide a tactical simulated shooting barricade as described above wherein the barricade can be expanded by sliding the detachable barricade vertically along a sliding mechanism so that the barricade can be placed on the floor behind the countertop within an indoor range shooting booth.

It is a further object of the present invention to provide a tactical simulated shooting barricade with circular, triangular, rectangular and square cut-outs to access a target down-range.

It is a further object of the present invention to provide a tactical simulated shooting barricade as described above that can be collapsed or expanded by sliding the two halves along a sliding mechanism that is cantilever attached base support for use at an outdoor range.

It is another object of the present invention to provide a tactical simulated shooting barricade as described above that consists of a sliding mechanism consisting of locking part, a mid sliding part and a locking mechanism that enables the detachable barricade to glides vertically up and down the base barricade to accommodate different shooter heights and different shooter stance.

It is another objective of the present invention as described above to provide a tactical shooting barricade with a foldable leg and a collapsible portion (i.e., detachable barricade) that can be collapsed or removed for transportation and storage.

These and other objects, features and advantages of the present invention will be understood in greater detail from the following description and the essential drawings wherein figures are utilized to designate a preferred embodiment.

BRIEF DESCRIPTION OF THE DRAWINGS

FIG. 1 is an exploded detailed view of the invention, showing all the components, including the combined base barricade and detachable barricade and the sliding mechanism that links the two major parts of the barricade (i.e., base barricade and detachable barricade)

FIG. 2 is a front, top and side view of the base barricade and the detachable barricade joined together in the fully collapsed mode.

FIG. 3 is a front and side view of the base barricade, including a detail view of the base stand that supports vertical barricade.

FIG. 4 is a side, top and front view of the invention with the support base stand fold away for storage and transportation to and from a gun range.

FIG. 5 is front view of the invention showing the Velcro strip used for locking the base stand to the vertical portion of the base barricade for storage and transportation.

FIG. 11 is the mid sliding part of the sliding mechanism consisting of milled holes to adjust the detachable barricade at different heights against the vertical portion of the base barricade.

FIG. 12 is a support above the support leg that forms vertical portion of the cantilever vertical sliding mechanism of the base barricade.

FIG. 14 is the support that joins the two legs of the support base.

FIG. 16 is the dowel lock that is laterally inserted in one of the corresponding milled holes in the sliding mechanism of the base barricade and vertical barricade to incrementally adjust the height displacement of the barricade.

FIG. 20 shows how the barricade is used at an indoor range: FIG. 20A shows the base barricade alone atop the countertop in the shooter's booth of the gun range; FIG. 20B shows the barricade (base barricade combined with detachable barricade) standing on the floor in front of the countertop within the shooter's booth at an indoor gun range; and FIG. 20C shows a shooter engaging a target down range from behind the base barricade sitting atop the countertop in a shooter's booth within a gun range.

FIG. 21 shows the locking dowel inserted into the sliding mechanism of the barricade to adjust its height displacement.

DETAILED DESCRIPTION OF THE INVENTION

Figure 17:
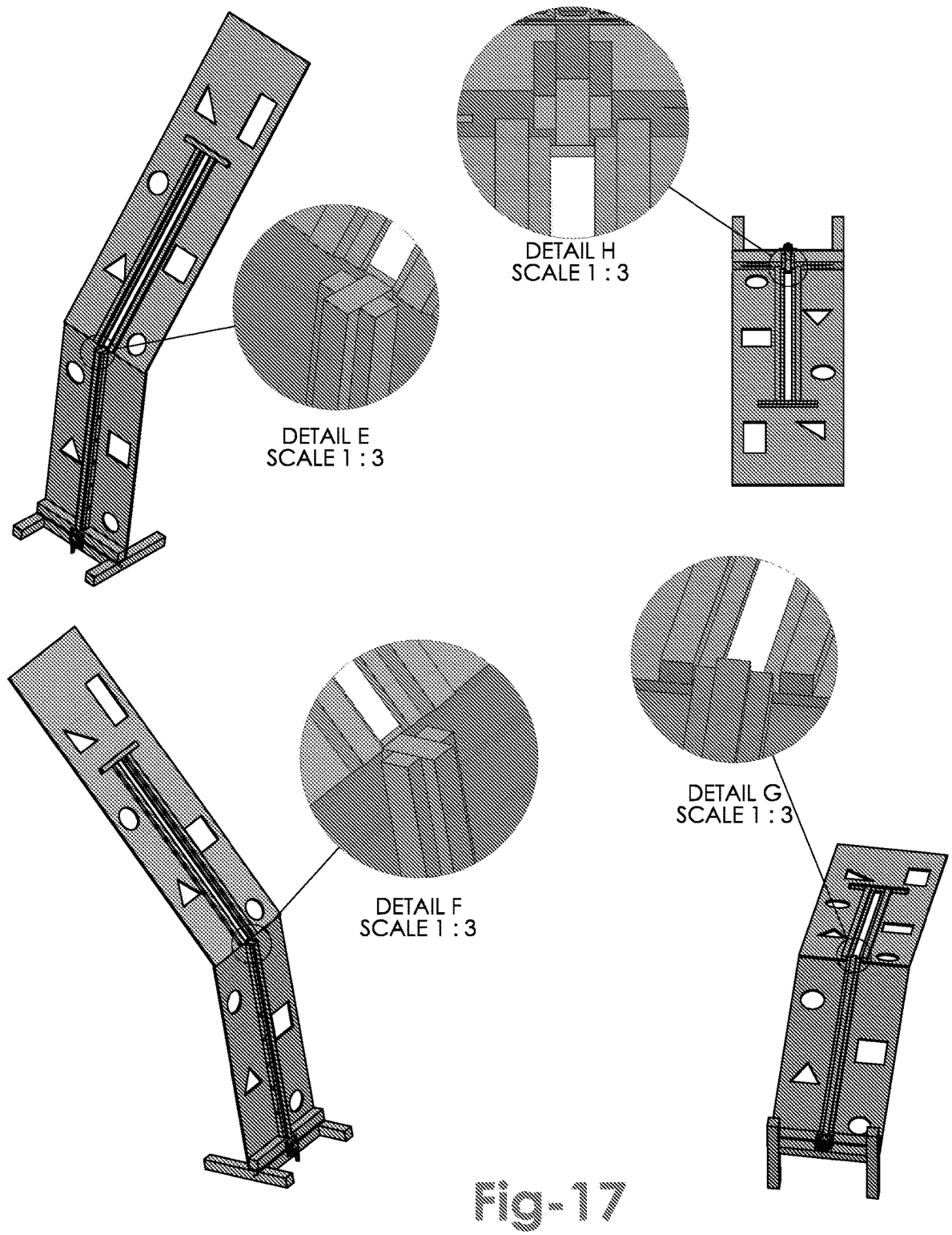
FIG. 17 is a three-dimensional drawing showing how the detachable barricade attached to the base barricade.
Figure 18:
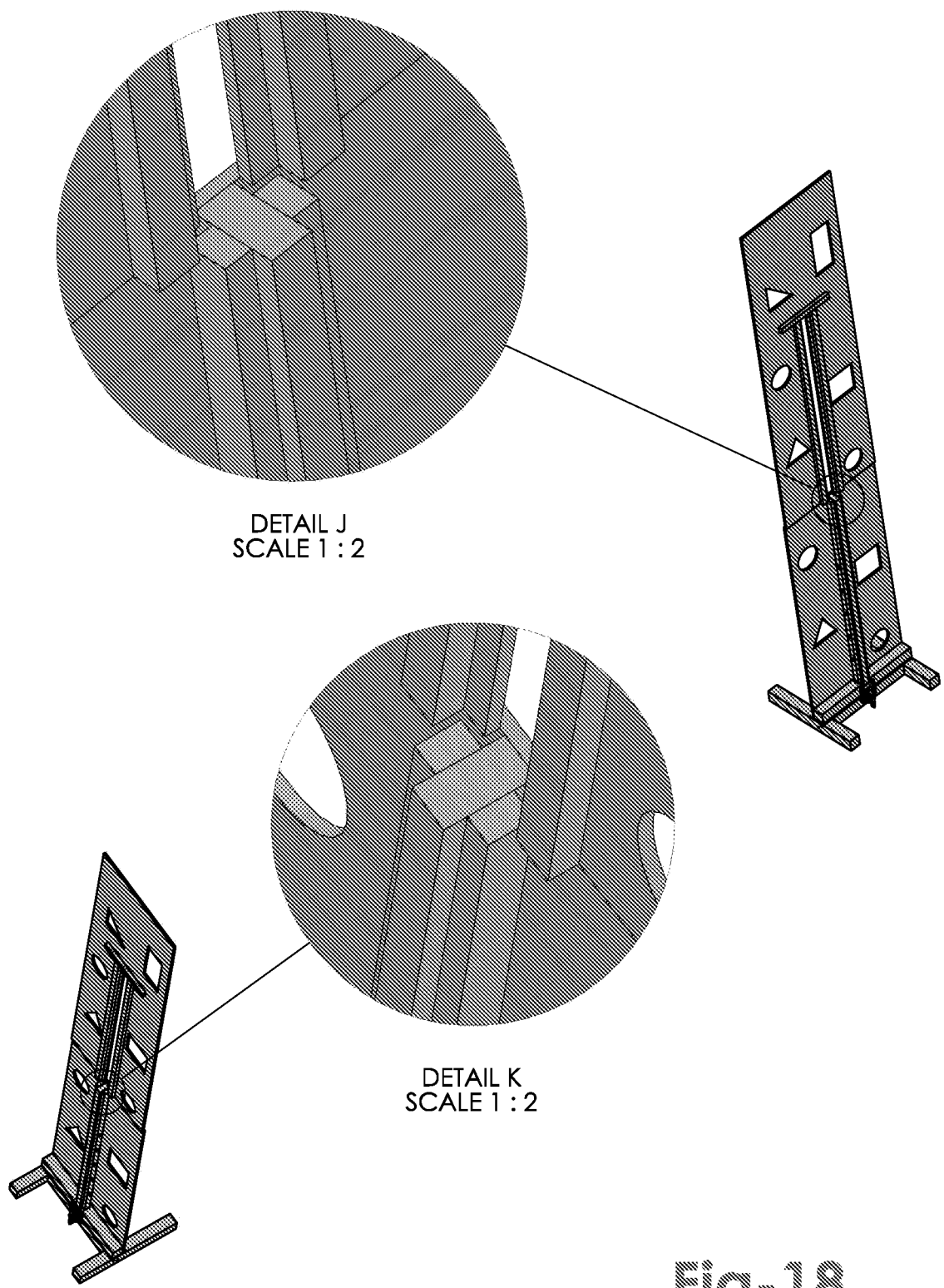
FIG. 18 shows the detachable barricade in relation to the base barricade and a close-up view of the sliding/locking mechanism.

The present invention has a conventional purpose: Specifically, it is a barricade with cut-outs of various sizes and shapes and edges that enable a firearm user at a shooting range to visually acquire and then engage a target downrange as shown in FIG. 20. The invention simulates cover and concealment. A cover is anything that both hides a person from the view of an attacker and protects the person hiding behind it from incoming projectile from a gun. Concealment is anything that merely hides the individual from being seen by the attacker but offers no protection from incoming rounds. The present invention is intended to simulate cover and concealment and to enable the defender to practice how to respond to a shooter by engaging that target from behind the barricade. The invention is therefore not a "ballistic shield" or "tactical shield" to defend from incoming firearms projectiles as identified by Martin (U.S. Pat. No. 9,631,901). In the current invention, the firearm may be rested against the actual surface of the barricade, including its edges and cut-outs, or shot from a distance behind the barricade after the target has been visually acquired downrange by look through or around any of its edges or cut-outs. It is to be used on a gun range to facilitate target acquisition from a simulated cover or concealment. The present invention is novel in its operation and functionality and distinguishable from the prior art in three key elements or processes:
1. The portable tactical simulated barricade is adjustable to different shooter heights by being expandable as shown in FIG. 18 and collapsible as shown in FIG. 5.
2. Said invention is designed for use from inside the shooter's booth at an indoor gun range as shown in FIG. 20.
3. Said invention is portable because of its two-piece interlocking structure as shown in FIG. 17 and FIG. 18, and its foldable support stand (FIG. 4)

Figure 6:
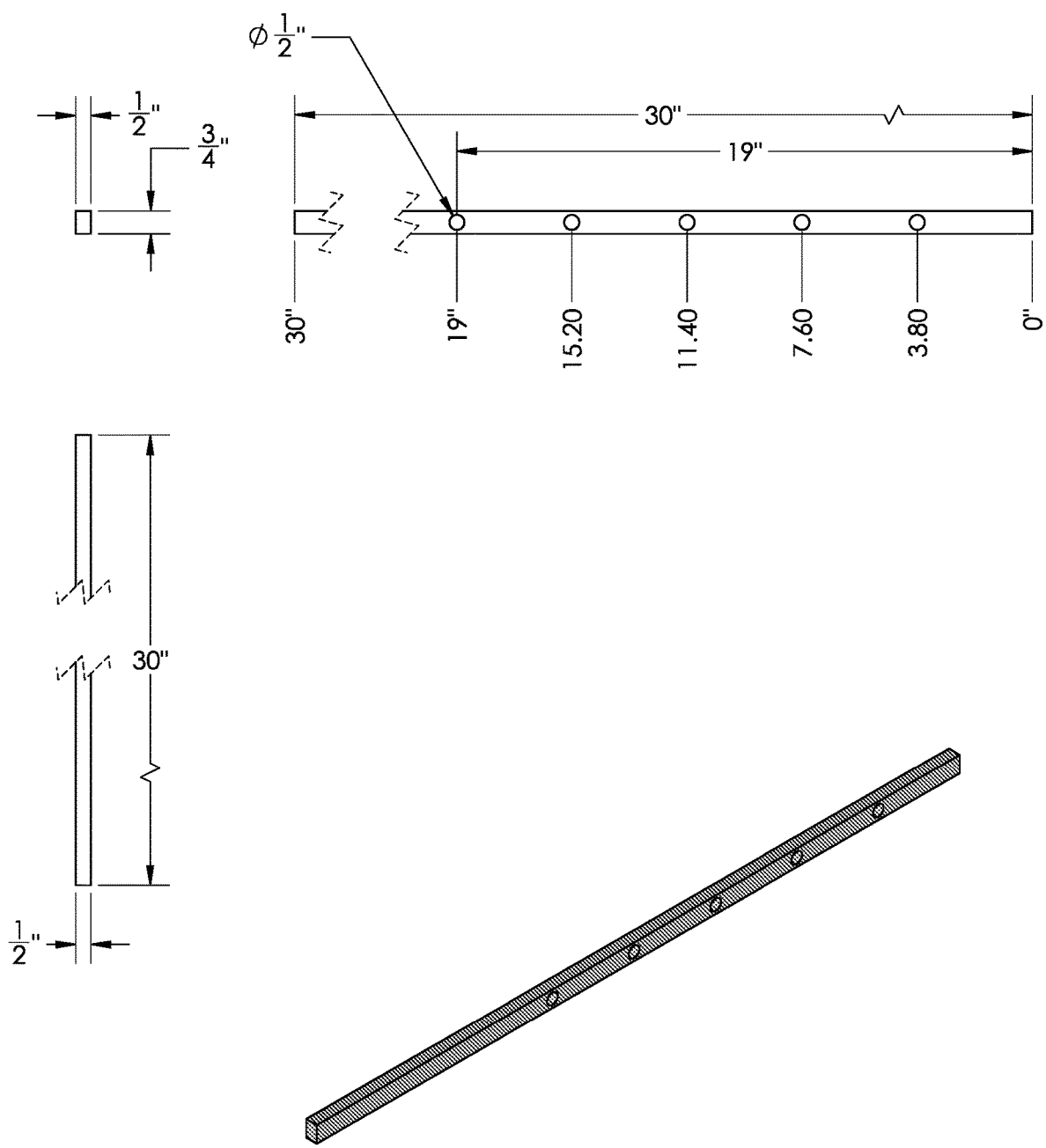
FIG. 6 is a perspective view of the mid sliding part of the cantilever sliding mechanism with laterally milled holes that allow the detachable barricade to slide up and down the base barricade, and locked in place by insertable dowel lock to accommodate different shooter height levels.
Figure 7:
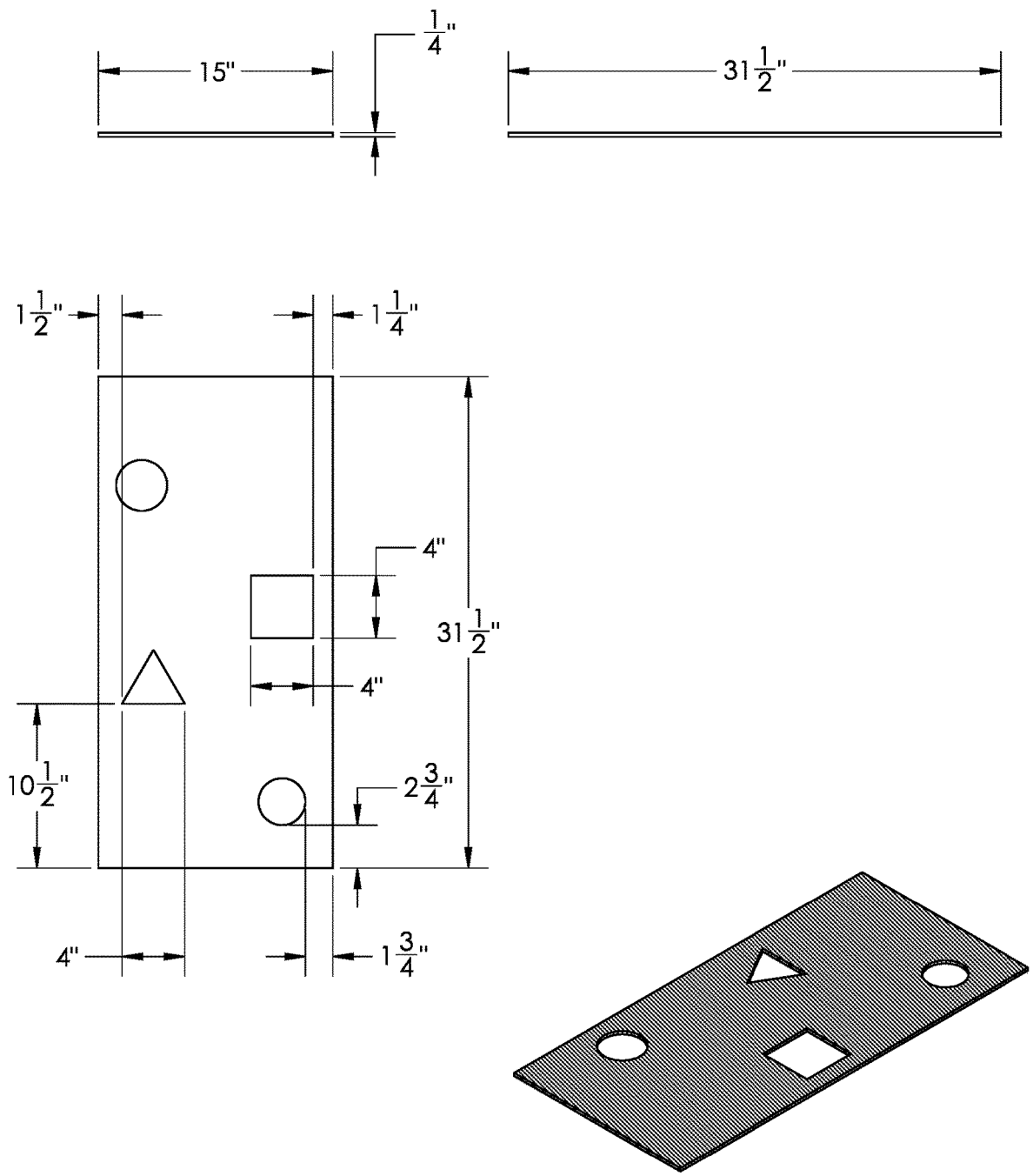
FIG. 7 is a front view of cut-outs in the base barricade that allow a shooter to access and engage a target down-range.
Figure 8:
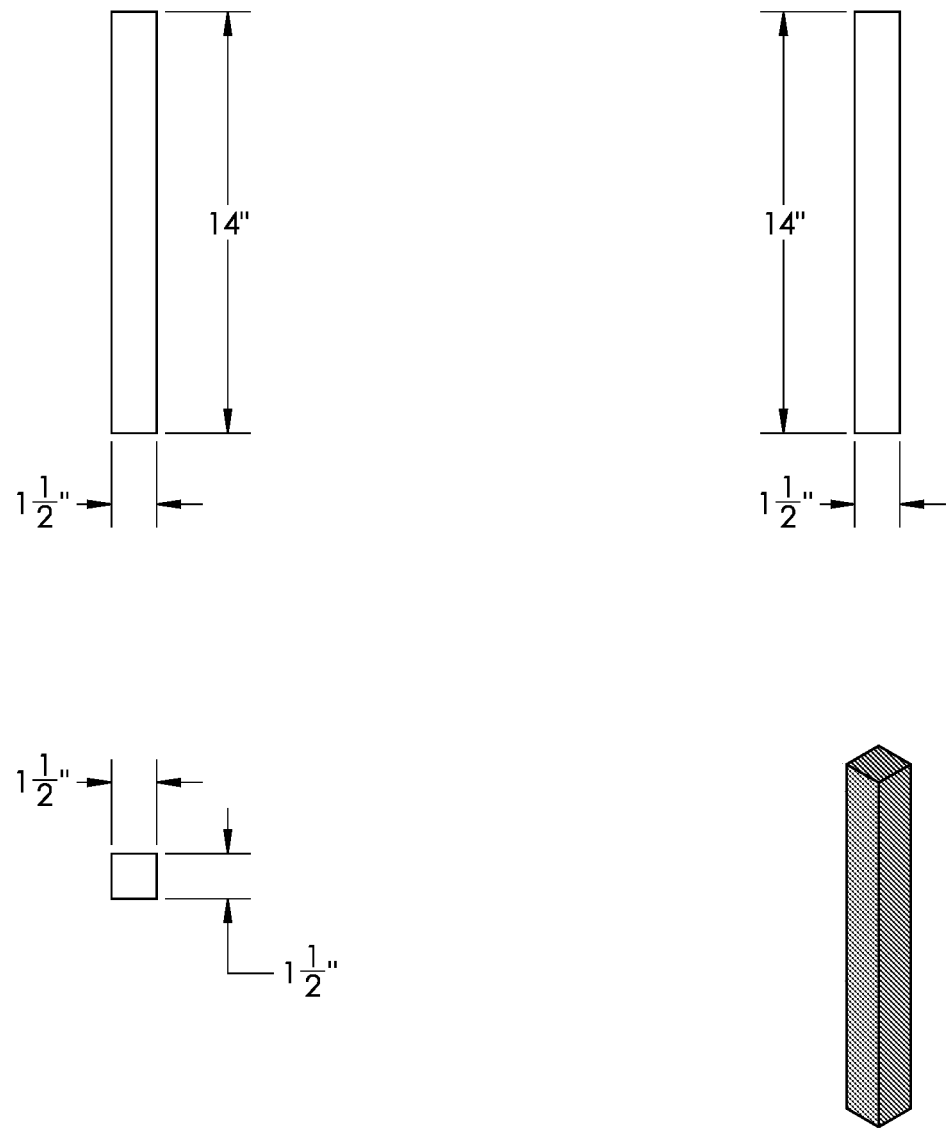
FIG. 8 is a front, side and top view of the left and right legs of the base stand that supports the vertical barricade.
Figure 9:
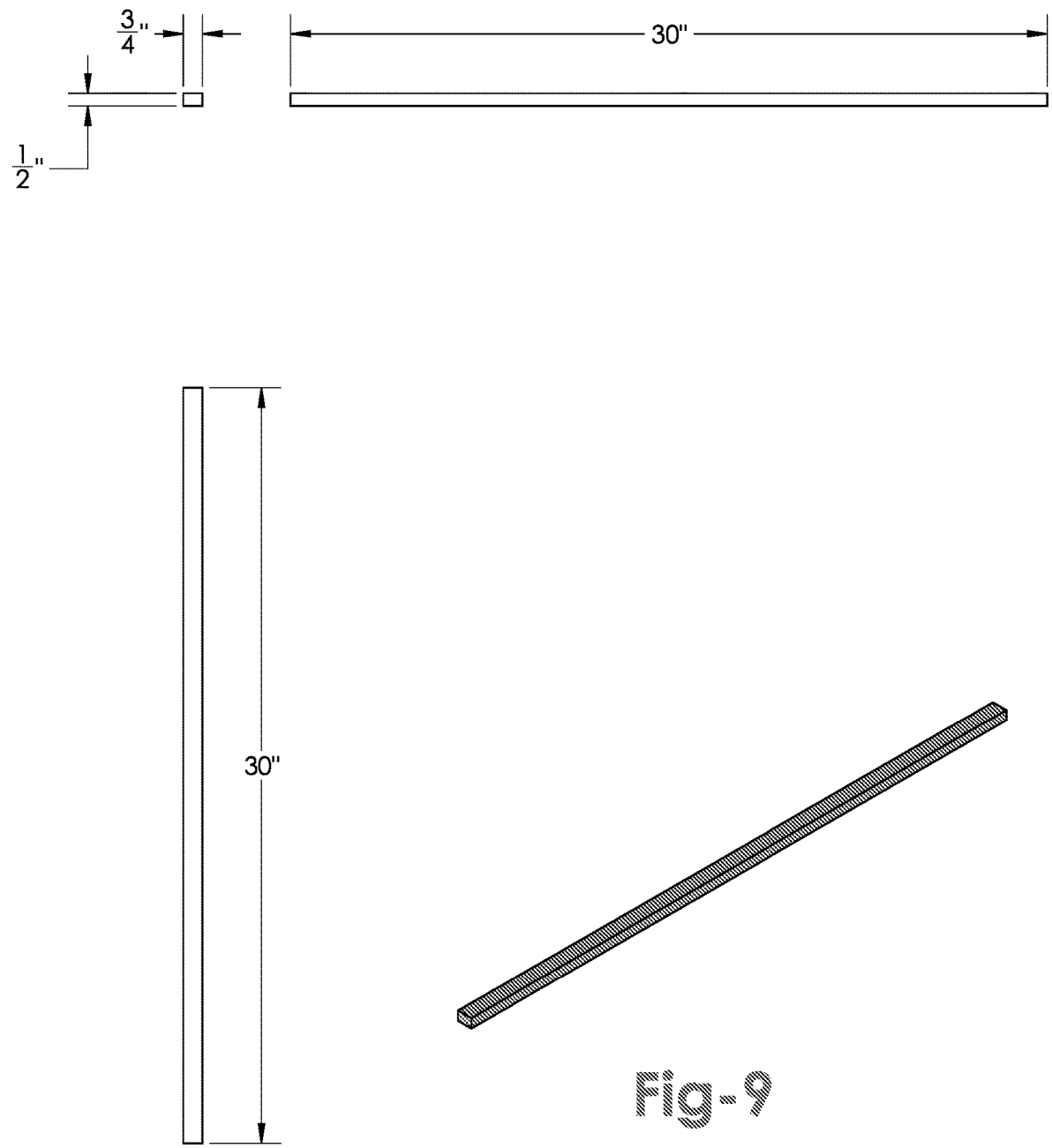
FIG. 9 is the locking part that runs vertically along the mid sliding part to keep the detachable barricade attached parallelly to the base barricade.
Figure 10:
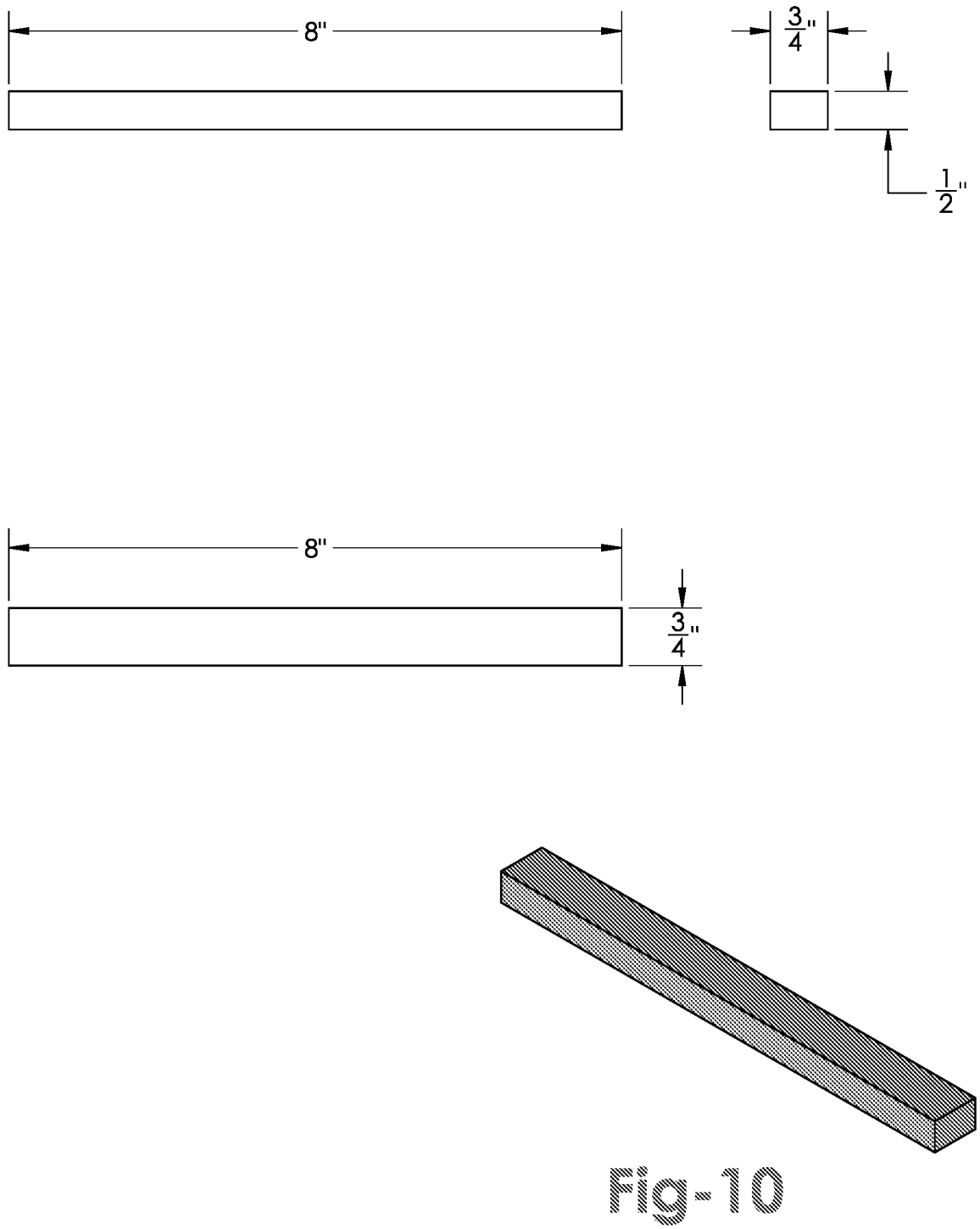
FIG. 10 is the top of the locking part that runs perpendicular to the two vertical locking parts of the sliding mechanism.
Figure 13:
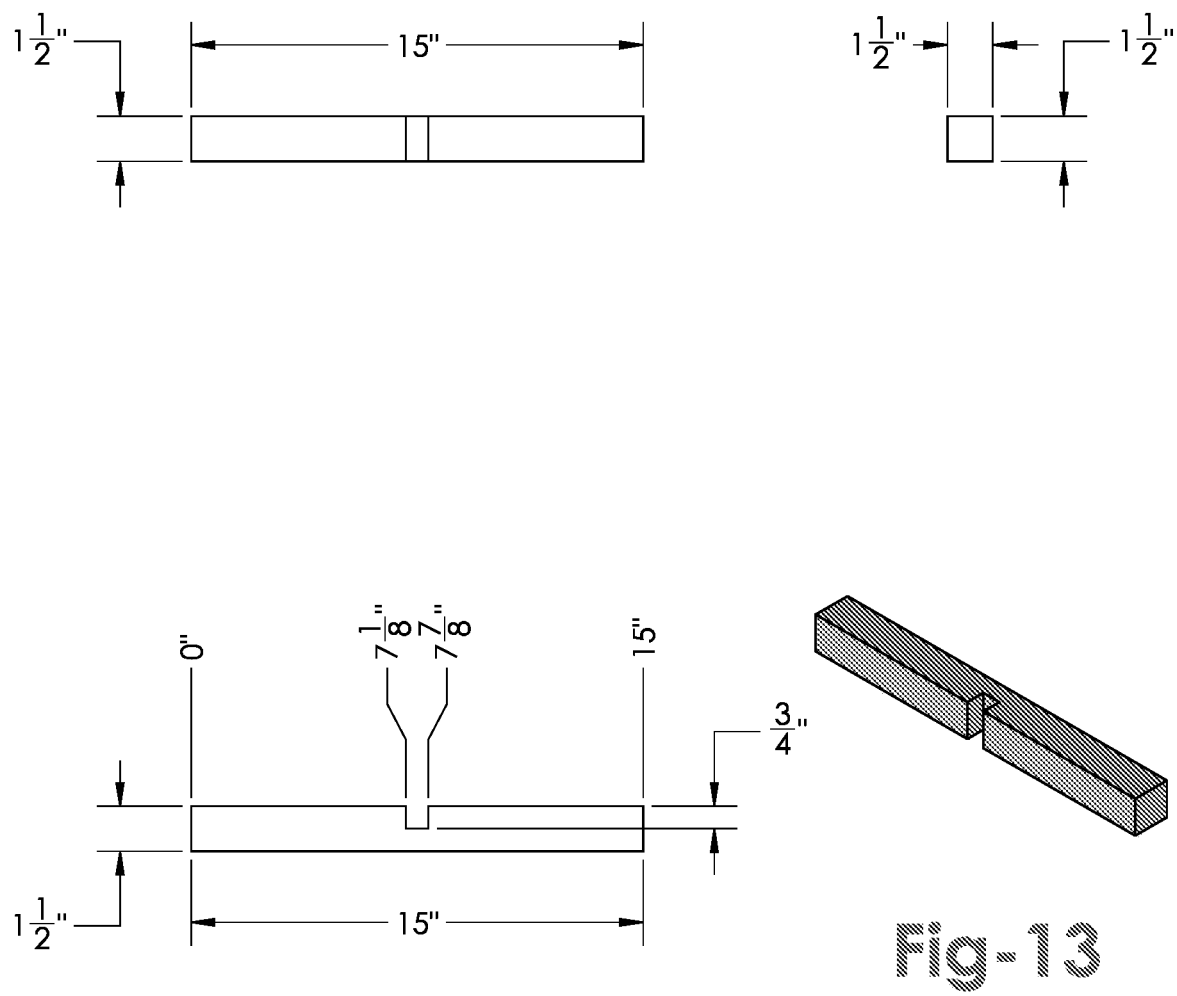
FIG. 13 is the support above the leg support onto which the mid sliding part attaches perpendicularly to form the support for the vertical base barricade.
Figure 15:
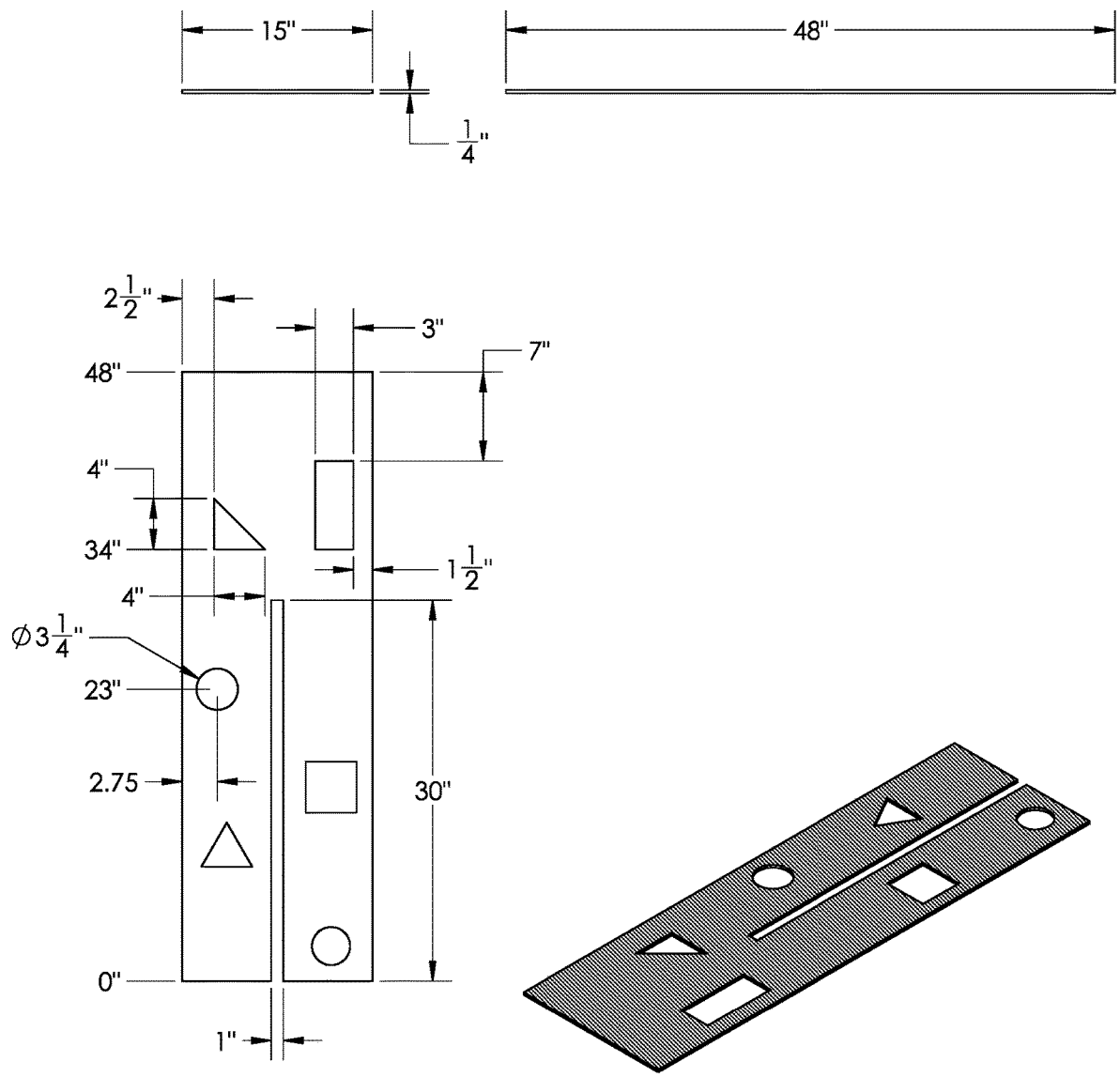
FIG. 15 is the front, top and side views of the detachable barricade, including cut-outs to enable the shooter to access a target down-range.

The present invention is adjustable to different user heights due to its two (2) two interlocking but independent parts: A base barricade (FIG. 3) and a detachable barricade (FIG. 15).

(1) Base Barricade: This is the main supporting structure of the present invention. At its center is a vertical cantilever sliding mechanism as shown in FIG. 1, FIG. 17, and FIG. 18. On either sides of this sliding mechanism are cut-outs and horizontal and vertical edges to acquire target downrange (FIG. 2, FIG. 3, FIG. 4, FIG. 7, FIG. 17, FIG. 18 and FIG. 20.

(2) The detachable barricade is of similar width but taller than the base barricade and has cut-outs, and horizontal and vertical edges to acquire target downrange. It has a matching vertical cantilever system at the center of the structure that inserted into the interlocking structure of the sliding part of the base barricade as shown in FIG. FIG. 11, FIG. 17 and FIG. 18, allowing the detachable barricade to slide up and down the base barricade to change the vertical height displacement of the present invention.

The cantilever systems on both the base barricade and the detachable barricade has matching holes milled at different heights so that the detachable barricade is locked in place against the base barricade by a dowel that is inserted horizontally through each respective matching holes (FIG. 1, FIG. 2, FIG. 5 and FIG. 21. This feature allows barricade to adjust incrementally from a height of 51" to 72." Removal of the horizontal dowel allows the detachable barricade to be completely dislodged from the base barricade (FIG. 17).

The present invention was developed to have a portable barricade suited for use in the shooter's booth at an indoor gun range (FIG. 20). As shown in FIG. 20A and FIG. 20C, the base barricade alone is placed on the countertop of the shooter's booth at an indoor range, allowing the user to acquire a target downrange from behind the counter. As shown in FIG. 20B both parts of the barricade when combined can also be placed directly on the ground in front of the shooter's booth to allow the user to acquire a target down range. The base barricade or in combination with the detachable barricade is used conventionally at an outdoor gun range to tactically acquire and engage targets down range through it cut-outs and edges.

Figure 19:
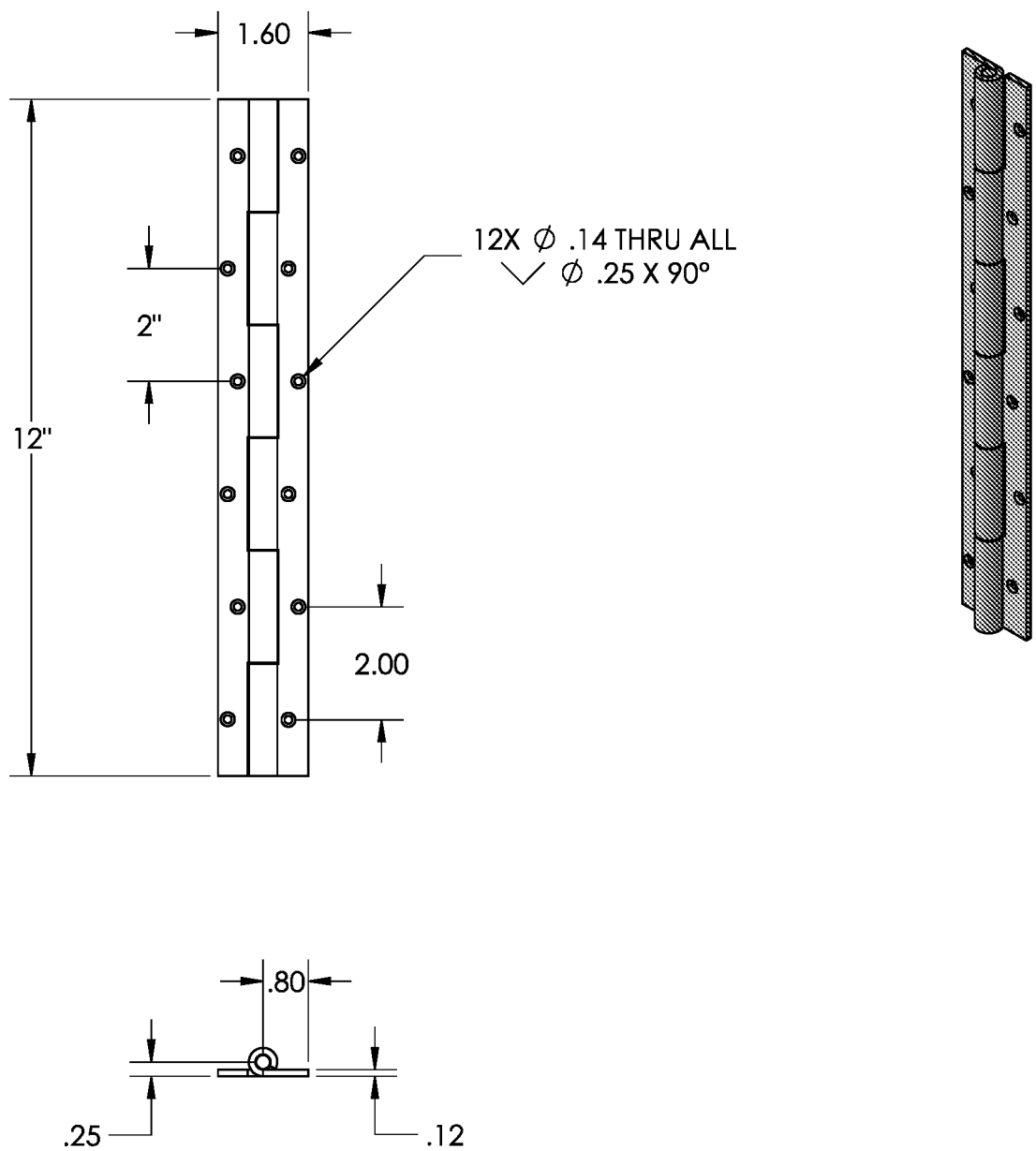
FIG. 19 is a front, top and three dimensional view of the continuous hinge.

The present invention has a base barricade with a foldable stand or base consisting of a pair of horizontal legs, allowing it to stand independently in place (FIG. 2, FIG. 3, FIG. 5, FIG. 8, FIG. 14, FIG. 15. The stand is lock perpendicularly to base barricade a sash lock on one side (FIG. 2). On the other side of the stand is a continuous hinge (FIG. 2 and FIG. 19) that enables it to fold away toward the vertical portion of the base barricade and away from the cantilever sliding mechanism (FIG. 4). The legs of the foldable stand are locked in place against the vertical portion of the stand by Velcro strips (FIG. 1 and FIG. 2). This allows for easy transportation or storage when the barricade is not in use.

The invention claimed is:

1. A tactical shooter barricade consisting of a base barricade and a detachable barricade that slides against one another via a cantilever mechanism that joins them at the center to allow the barricade to incrementally adjust in height displacement vertically; wherein the base barricade has a base with two legs perpendicularly to the vertical barricade with the cantilever mounted sliding mechanism; said sliding mechanism has a matching interlocking system, wherein male sliding potion on the detachable barricade is inserted into the female sliding portion of the base barricade; said interlocking sliding mechanism enables the base barricade and detachable barricade to slide against one another; said sliding mechanism has holes laterally milled through both the female sliding portion of the base barricade and the male sliding portion of the detachable barricade; said matching holes have a corresponding dowel lock that when inserted allows the detachable barricade to slide up or down the base barricade to make the barricade vertically adjustable to different shooter heights; wherein said sliding mechanism allows both the base barricade and the detachable barricade to be completely detached from one another; said sliding mechanism is willfully designed to enable the base barricade to sit independently atop the countertop of a shooter's booth at an indoor gun range.

2. A tactical shooting barricade where said base stand identified in claim 1 can be folded back towards the vertical portion of the base barricade for easy transpiration and storage; wherein the base stand is locked perpendicularly against the vertical portion of the base barricade by a sash lock on one side; where said base stand is attached on the opposite side of the sash lock by a continuous hinge; said continuous hinge allows the base stand to pivot against the vertical portion of the base barricade; said continuous hinge constitutes a folding mechanism that enables the two legs of the base stand to rotate 90 degrees backwards so that the base stand is parallel to the vertical portion of the base barricade; wherein said legs are locked in place against the vertical portion of the base barricade by Velcro strips; said folding and locking mechanism of the base stand enables the barricade to be stored in a closet or under a bed; wherein said folding and locking mechanism of the base stand enables the barricade to be readily transportable via hand or automobile.

* * * * *